US008696299B2

(12) United States Patent
Bywater et al.

(10) Patent No.: US 8,696,299 B2
(45) Date of Patent: Apr. 15, 2014

(54) COMPRESSOR

(75) Inventors: John Michael Bywater, Huddersfield (GB); James Alexander McEwen, West Yorkshire (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 515 days.

(21) Appl. No.: 12/776,041

(22) Filed: May 7, 2010

(65) Prior Publication Data

US 2011/0002770 A1 Jan. 6, 2011

(30) Foreign Application Priority Data

May 7, 2009 (GB) .................................... 0907865.0

(51) Int. Cl.
*F04D 27/02* (2006.01)
(52) U.S. Cl.
USPC ................................. 415/1; 415/145; 415/206
(58) Field of Classification Search
USPC .............. 415/158.1, 145, 151, 158–159, 205, 415/206
See application file for complete search history.

(56) References Cited

U.S. PATENT DOCUMENTS

| | | | | |
|---|---|---|---|---|
| 3,994,620 | A * | 11/1976 | Spraker et al. ................ | 415/145 |
| 4,743,161 | A | 5/1988 | Fisher et al. | |
| 5,380,151 | A * | 1/1995 | Kostka et al. ................ | 415/145 |
| 6,158,956 | A * | 12/2000 | Arnold .......................... | 415/158 |
| 6,648,594 | B1 | 11/2003 | Horner et al. | |
| 6,872,050 | B2 * | 3/2005 | Nenstiel ........................ | 415/151 |
| 8,061,974 | B2 * | 11/2011 | Gu et al. ....................... | 415/145 |
| 8,210,793 | B2 * | 7/2012 | Hale ............................. | 415/58.2 |

FOREIGN PATENT DOCUMENTS

| | | |
|---|---|---|
| EP | 2 025 896 | 2/2009 |
| GB | 1120275 | 7/1968 |
| WO | WO 2006/102912 | 10/2006 |
| WO | WO 2006102912 A1 * | 10/2006 |

OTHER PUBLICATIONS

United Kingdom Search Report, GB0907865.0, Aug. 13, 2009, Cummins Turbo Technologies Limited.
United Kingdom Search Report, GB0907865.0, Sep. 29, 2009, Cummins Turbo Technologies Limited.

* cited by examiner

*Primary Examiner* — Nathaniel Wiehe
*Assistant Examiner* — Woody A Lee, Jr.
(74) *Attorney, Agent, or Firm* — Krieg DeVault LLP; Clifford W. Browning (57) ABSTRACT

A compressor comprises an impeller wheel mounted within a housing defining an inlet and an outlet. The wheel has a plurality of vanes and is rotatable about an axis. The housing has an inner wall defining a surface located in close proximity to radially outer edges of the impeller vanes which sweep across said surface as the impeller wheel rotates about its axis. The inlet comprises inner and outer tubular walls extending away from the impeller wheel in an upstream direction and defining between them gas flow passage. A bleed passage between the gas flow passage and the impeller wheel is selectively opened and closed by movement of a sliding sleeve in a helical direction.

22 Claims, 5 Drawing Sheets

COMPRESSOR

CROSS REFERENCE TO RELATED APPLICATIONS

The present application claims priority to United Kingdom Patent Application No. 0907865.0 filed May 7, 2009, which is incorporated herein by reference.

The present invention relates to a compressor and a method for operating the same. In particular, the invention relates to the inlet arrangement of a centrifugal compressor and to a turbocharger incorporating such a compressor.

A centrifugal compressor comprises an impeller wheel, carrying a plurality of blades (or vanes) mounted on a shaft for rotation within a compressor housing. Rotation of the impeller wheel causes gas (e.g. air) to be drawn into the impeller wheel and delivered to an outlet chamber or passage. In the case of a centrifugal compressor the outlet passage is in the form of a scroll volute defined by the compressor housing around the impeller wheel and in the case of an axial compressor the gas is discharged axially.

The turbocharger is a well-known device for supplying air to the intake of an internal combustion engine at pressures above atmospheric (boost pressures) and is widely used on automobiles and the like. The compressor of a turbocharger is driven by an exhaust gas turbine that is mounted on a common shaft. Exhaust gas from the internal combustion engine flows through the turbine and drives the turbine wheel in rotation, which, in turn, rotates the compressor impeller. Air is drawn through an axial inlet of the compressor housing and compressed air is delivered to the intake manifold of the internal combustion engine, thereby increasing engine power.

One aspect of turbocharger control is to ensure stable operation by avoiding what is known as surge. If the turbocharger is operating at a relatively low compressor volumetric air flow rate and a high boost pressure the air flow into the compressor may stall and the operation of the compressor is interrupted. Following stall, the air flow tends to reverse through the compressor event until a stable pressure ratio is reached at which the air can flow in the correct direction. The reverse flow of air tends to be violent and causes noise. This process repeats and results in pulsations in the air flow known as surging. Maximum operating efficiency of the engine is achieved by operating close to the surge limit and a surge margin is built into the control process to ensure that the turbocharger operates at a safe distance from the surge condition.

In turbochargers of the present applicant the compressor inlet has a structure that is known as an MWE™ inlet structure. A structure of this kind is described for instance in U.S. Pat. No. 4,743,161. In that document the inlet structure comprises two coaxial tubular inlet sections, an outer inlet section or wall forming the compressor intake and inner inlet section or wall defining the compressor inducer, or main inlet. The inner inlet section is shorter than the outer inlet section and has an inner surface that is an extension of a surface of an inner wall of the compressor housing which is swept by edges of the impeller wheel blades. The arrangement is such that an annular flow path is defined between the two tubular inlet sections, the path being open at its upstream end and provided with an annular (or partially annular) slot or arrangement of apertures at its downstream end that communicates with the inner surface of the compressor housing that faces the impeller wheel. In operation, the slot allows additional air to be drawn into the compressor under high flow (near choke) conditions, however its most important function is at lower flow rates and, in particular, as the compressor approaches surge. Under these conditions the slot allows the flow to reverse (which is now the prevalent flow regime in parts of the compressor) and to be re-circulated to the intake, thus delaying surge. The reversal in air flow prevents turbulence disrupting the air flow at the leading edge of the impeller so that stall and subsequent surge is avoided.

It is well known that a structure of the kind described above stabilises the performance of the compressor increasing the maximum flow capacity and improving the surge margin, i.e. decreasing the flow at which the compressor surges, so that the range of engine r.p.m. over which the compressor can operate in a stable manner is increased. A given compressor can thus be matched to engines with a wider speed range. This is known as increasing the width of the compressor "map", which is a plot of the compressor characteristic.

It has been shown that increasing the length of the inner inlet section and therefore the annular flow path improves the surge margin. However, the benefits can drop with increasing length particularly since the efficiency of such a compressor can be reduced.

One disadvantage of the MWE™ inlet structure is that may reduce the efficiency of operation of the compressor slightly at certain conditions and may increase the nose produced by the impeller particularly near surge conditions.

It is an object of the present invention to obviate or mitigate the aforementioned, and/or other disadvantages. It is also an object to provide for an alternative compressor.

According to a first aspect of the present invention there is provided a compressor comprising: a housing having a gas inlet and a gas outlet; an impeller wheel having a plurality of vanes and mounted in the housing between said inlet and outlet, the wheel being rotatable about an axis; the housing having an inner wall defining a surface located in close proximity to radially outer edges of the impeller vanes which sweep across said surface as the impeller wheel rotates about its axis; the gas inlet comprising an outer tubular wall extending away from the impeller wheel in an upstream direction and defining a gas intake portion of the inlet, and an inner tubular wall extending away from the impeller wheel in an upstream direction within the outer tubular wall and defining an inducer portion of the inlet; a gas flow passage defined between the inner and outer tubular walls; at least one bleed passage providing fluid communication between the impeller wheel and the gas flow passage; a sliding member disposed in the inlet and slidable between a first position in which the bleed passage has a minimum size and a second position in which the bleed passage has a maximum size; wherein the sliding member is arranged to move between the first and second positions in a direction that describes substantially at least part of a helix. The movement of the sliding member in the helical direction entails a simultaneous rotational and axial displacement. The helical displacement allows a relatively short sleeve to be used whilst ensuring alignment of the sleeve with the inlet. The sleeve may have an axis of rotation that is substantially coaxial with an axis of the inlet which in turn may be substantially coaxial with the axis of rotation of the impeller wheel.

There may be provided a guide arrangement for guiding movement of the sliding member between the first and second positions in the direction. The guide arrangement may comprise at least one projection that is received in a corresponding at least one slot that extends a direction that describes substantially at least part of a helix, which may extend around the inlet, preferably about the axis. The projection may take any form. For example it may comprise, a rib or ridge that has not only radial dimension and may have a significant axial dimension and may extend in a direction that is substantially at least part of a helix such as, for example, thread. Alternatively the projection may comprise a peg, pin, strut or the like that may extend substantially in a radial direction without a significant axial dimension. The at least one projection may provided on the sliding member and the at least one slot may be provided in the outer tubular wall, although in some embodiments their locations may be reversed.

The at least one slot may comprise at least one first slot that defines an opening through the outer tubular wall. The at least one projection may comprise at least one first projection that projects through the at least one first slot and is moveable along the at least one first slot by an actuator so as to effect movement of the sleeve in the helical direction. The at least one slot may comprise at least one second slot in the form of a groove defined in the outer tubular wall. The at least one projection may comprise at least one second projection that extends into the groove. For example, there may be provided a first projection on the sleeve that projects outwardly through an open slot in the outer tubular wall and one or more second projections that extend outwardly from the sleeve into a groove on an inside surface of the outer tubular wall, the first and second projections being angularly spaced around the axis.

The sliding member may be in the form of a sleeve which may be mounted on the inner tubular wall and slidable over the inner tubular wall between the first and second positions in the direction that describes substantially at least part of a helix.

Alternatively the sleeve may be arranged to slide over an inside surface defined by the outer tubular wall. The sleeve may be fixed to the inner tubular wall such that in the first position of the sleeve the inner tubular wall occupies a first axial position in which the bleed passage has a minimum size and in the second position of the sleeve the inner tubular wall occupies a second axial position in which the bleed passage has a maximum size.

The bleed passage may be defined between the inner tubular wall of the housing inlet and the inner wall of the housing.

There may be provided a plurality of struts interconnecting the sleeve and the inner tubular wall.

The sleeve and the inner tubular wall may be interconnected and may be provided as a removable component for insertion into the outer tubular wall of the inlet.

The sleeve may comprise an inner sleeve that is connected to an outer sleeve, the inner and outer sleeve being provided as a removable component for insertion into the outer tubular wall of the inlet, the inner sleeve being mounted on the inner tubular wall.

Any form of actuator may be provided to move the sliding member in the helical direction. Such an actuator may be located on the outside of the compressor housing or otherwise. It may preferably be located on or near an outlet volute of the compressor housing.

According to a second aspect of the present invention there may be provided a turbocharger comprising a compressor according to any preceding claim, and a turbine for driving the impeller wheel in rotation.

The turbocharger may comprise a control device for selectively controlling the movement of the sliding member between the first and second positions. The control device may from part of an engine management system of a vehicle having an engine to which the turbocharger is fitted.

According to a third aspect of the present invention there is provided an internal combustion engine fitted with a turbocharger as defined above.

According to a fourth aspect of the present invention there is provided a method for operating a compressor, the compressor comprising a gas inlet and a gas outlet, an impeller wheel between said inlet and outlet, the wheel being rotatable about an axis, the inlet comprising inner and outer tubular walls between which a flow passage is defined, and at least one bleed passage providing fluid communication between the impeller wheel and the gas flow passage; the method comprising selectively moving a sliding member in the inlet in a substantially helical direction between a first position in which the bleed passage has a minimum size and a second position in which the bleed passage has a maximum size.

In accordance with a further aspect of the present invention there is provided a compressor comprising housing defining a gas inlet and a gas outlet; an impeller wheel between the gas inlet and the gas outlet; the inlet having a main inducer for directing gas to the impeller wheel and a gas flow passage around the inducer; at least one bleed passage providing fluid communication between the gas flow passage and the impeller wheel; and a sliding member arranged to move in a direction that describes substantially at least part of a helix to control gas flow through the at least one bleed passage.

Specific embodiments of the present invention will now be described, by way of example only, with reference to the accompanying drawings, in which.

Figure 1:
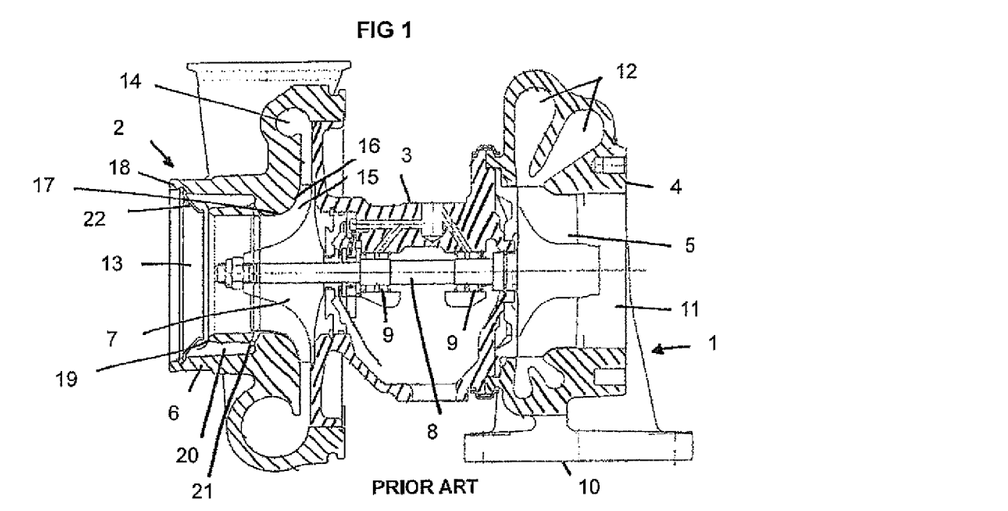
FIG. 1 is a view of a known turbocharger in section along the turbocharger axis, the turbocharger including a compressor that may be modified to be in accordance with the present invention.

Referring to FIG. 1, the illustrated turbocharger comprises a turbine 1 that is joined to a compressor 2 via a central bearing housing 3. The turbine comprises a turbine housing 4 that houses a turbine wheel 5. Similarly the compressor 1 comprises a compressor housing 6 that houses a compressor impeller wheel 7. The turbine wheel 5 and compressor impeller 7 are mounted on opposite ends of a common turbocharger rotary shaft 8 which is supported on bearing assemblies 9 in the bearing housing 3.

The turbine housing 4 is provided with an exhaust gas inlet 10 and an exhaust gas outlet 11. The inlet 10 directs incoming exhaust gas to an annular inlet chamber i.e. volute 12 from which it passes through the turbine wheel 5 to the outlet, imparting a rotational force on the wheel in the process. Rotation of the wheel 5 effects rotation of the shaft 8 and therefore the compressor impeller 7. Air is drawn into the compressor 2 through an air inlet 13 and delivers compressor air to the engine intake (or a downstream turbocharger) via an annular outlet volute 14, both the inlet 13 and the outlet 14 being defined by the housing 6.

The compressor impeller wheel 7 typically has a plurality of blades 15 each of which has an outer edge 16 that sweeps across an interior surface 17 of an inner wall of the compressor housing 6 when the impeller wheel 7 rotates about the shaft axis.

The air inlet 13 is defined by an outer tubular wall 18 and a shorter concentric inner tubular wall 19, both of which extend coaxially with the turbocharger axis. The outer tubular 18 wall forms a gas intake and an inner tubular wall 19 defines an inducer portion of the inlet. The inner surface of the inner tubular wall is an extension of a surface of an inner wall 17 of the compressor housing 6 which is swept by the outer edges of the impeller wheel blades. An annular flow passage 20 is defined between the inner and outer tubular walls 18, 19, the passage being open at its upstream end and provided with a bleed passage in the form of a substantially annular slot 21 at its downstream end for communication with the impeller wheel 7. The annular slot 21 is discontinuous in that it is interrupted by webs (not shown) that join the inner tubular wall 19 to the rest of the compressor housing.

A noise reduction baffle 22 is secured to an inwardly facing surface of the outer tubular wall 18 and extends axially and radially towards the inner tubular wall 19.

Figures 2, 3:
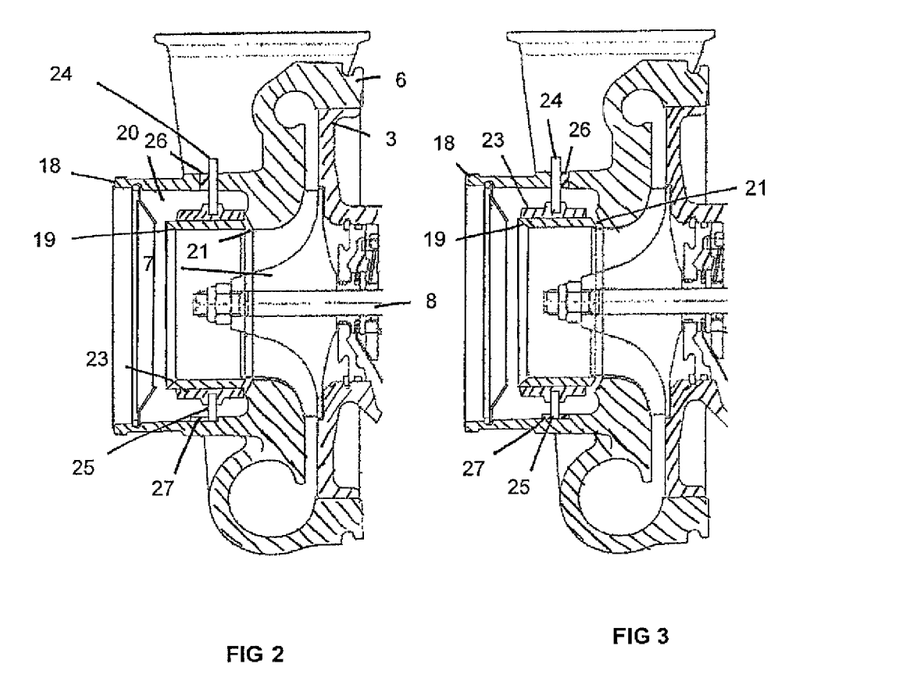
FIG. 2 is an axial sectioned view of a compressor in accordance with the present invention in a first configuration.
FIG. 3 an axial section view of the compressor of FIG. 2 in a second configuration.
Figure 9:
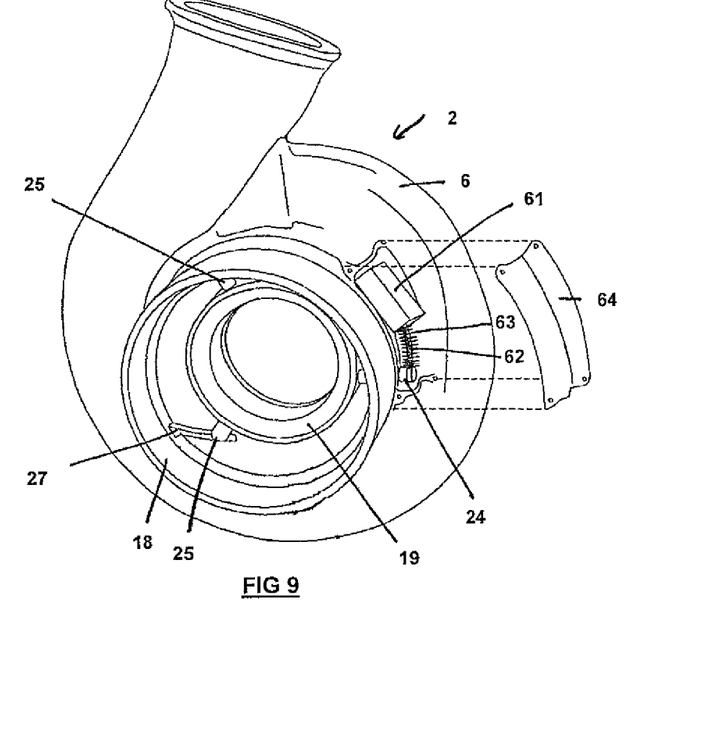
FIG. 9 is a front perspective view of a compressor in accordance with the present invention (with impeller wheel removed)

In FIGS. 2 and 3 the compressor of FIG. 1 is modified to be in accordance with the present invention such that communication between the annular flow passage 20 and the impeller wheel 7 is selectively closable. For convenience and ease of understanding the same reference numbers are used for parts in common with the compressor of FIG. 1. An annular sleeve 23 is disposed around the inner tubular wall 19 and is slidable between the position shown in FIG. 2 where the sleeve substantially closes the annular slot 21 such that air cannot bleed from the impeller into the annular flow passage 20 and the position shown in FIG. 3 where the sleeve 23 occupies an position in which the slot 21 is open to such bleed flow. The sleeve 23 is arranged to rotate on the inner tubular wall 19 about the turbocharger shaft axis as well as to move in the axial direction required to open and close the slot 21 such that any point on the sleeve 23 describes part of a helix in moving between the open and closed positions. The sleeve 23 has three pegs 24, 25 (only two shown in the sectioned view of the figures) that each extends in a substantially radial direction to engage with the outer tubular wall 18. One of the pegs 24 extends through an open slot 26 that penetrates through the wall 18, whereas the other two pegs extend into blind slots (e.g. grooves) 27 defined in the inwardly facing surface of the wall 18. The slot 26 and the grooves 27 describe part of a helix. The end of the peg 24 that passes through the slot 26 projects from the outer surface of the wall 18 and is coupled to a suitable actuator (not shown) for rotating the sleeve 23. Each of the pegs 24, 25 may be integrally formed with the sleeve 23 or alternatively may be separate components fixed to the sleeve in any suitable manner. An actuator for connection to the peg 24 is depicted in FIG. 9 and will be described later.

It will be understood that the positioning of the pegs may be varied. For example they may be equi-angularly spaced around the axis or otherwise. Moreover, the pegs may be axially offset instead of being axially aligned as shown.

The helical connection between the pegs and the slots and thus the helical movement between the sleeve 23 and the rest of the inlet reduces the risk of jamming and can ensure tight sealing. The arrangement ensures that a compact sleeve of relatively short length can be used whilst ensuring it remains aligned with the inlet.

The grooves 27 may have an axially extending lead-in portion that allows easy assembly of the sleeve 23 into the inlet with the pegs 24 in place.

Figure 4A:
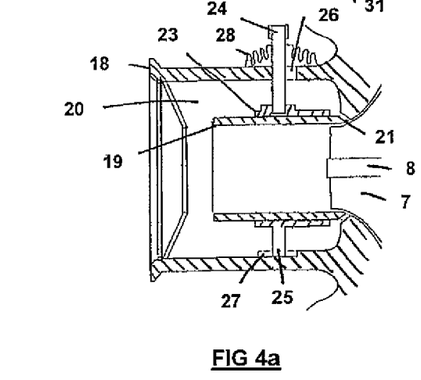
FIGS. 4a and 4b are axial sectioned views of an inlet part of a second embodiment of a compressor in accordance with the present invention, shown in first and second configurations.
Figure 4B:
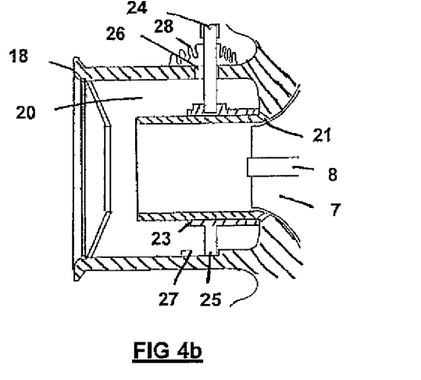

The peg 24 and slot 26 may be fitted with a protective guard 28 to prevent ingress of dirt and air as depicted in FIGS. 4a and 4b. The protective guard material should be flexible or loose enough to accommodate the requisite movement of the peg 24 relative to the slot 26 without compromising the sealing. One example is a bellows-type membrane.

Figure 5A:
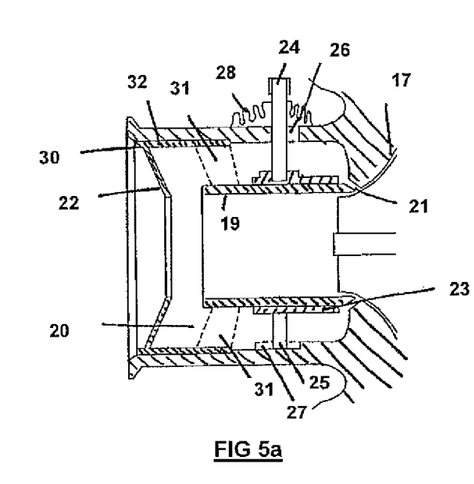
FIGS. 5a and 5b are axial sectioned views of an inlet part of a third embodiment of a compressor in accordance with the present invention, shown in first and second configurations.
Figure 5B:
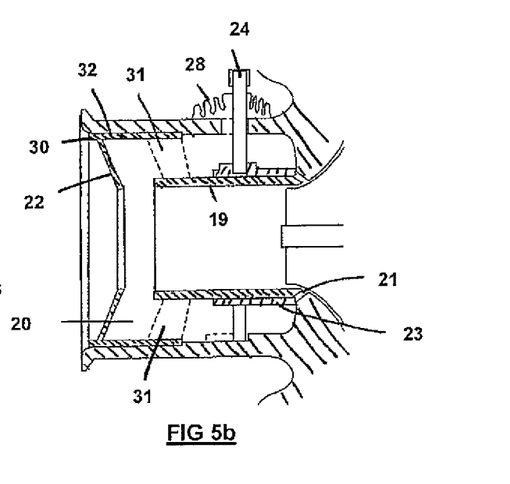

The inner tubular wall 19 may be provided by a separate component of the housing that is inserted into the outer tubular wall 18 as illustrated in FIGS. 5a and 5b. The insert 30 comprises the inner tubular wall 19 and a coaxial outer sleeve 32 that are interconnected by three radial struts 31 (two only shown), although any suitable number may be adopted. The sleeve 32 has an outer diameter that is designed to fit in a corresponding recess in the inner surface of the outer tubular wall 18 in a press-fit engagement. The noise reduction baffle 22 is integrally formed with the outer sleeve 32 but may be a separate component that is fixed to the sleeve. As before, the slot 21 is opened and closed by the sliding helical movement of the inner sleeve 23. The arrangement of this embodiment can serve to improve noise reduction as it allows the annular slot 21 to be continuous and not interrupted by webs that interconnect the inner tubular wall 19 to the inner wall 17 of the compressor housing.

Figure 6A:
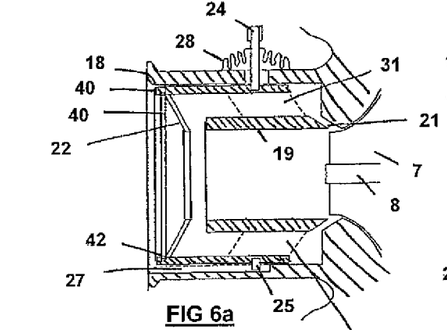
FIGS. 6a and 6b are axial sectioned views of an inlet part of a fourth embodiment of a compressor in accordance with the present invention, shown in first and second configurations.
Figure 6B:
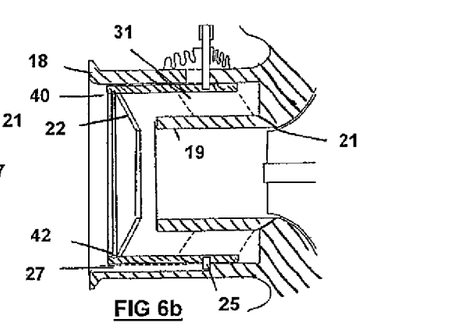

In FIGS. 6a and 6b there is shown an alternative approach to the selective opening and closing of the annular slot 21. In this embodiment there is no inner sleeve that is moved to selectively block and uncover the slot 21 but instead an insert 40 similar to the insert 30 of the embodiments of FIGS. 5a and 5b is arranged to slide in a helical direction so increase and decrease the size of the slot from a maximum to a minimum (in which it is substantially closed). The insert 40 has an outer sleeve 41 with an outer diameter having a size slightly smaller than the inner diameter of the outer tubular wall 18. Radial struts 31 interconnect the outer sleeve with the inner wall 19 such that the sleeve and inner tubular wall move together. The noise baffle 22 in this embodiment is a separate member in the form of a conical annulus that is secured in place by a suitable annular clamp member 42 such as, for instance, a circlip. The peg 24 extends through the partially helical open slot 26 as before and is driveable by the actuator along the slot 26 such that the insert 40 rotates about the axis and translates so as to describe a part helix. Similarly the peg 25 moves along the part-helical blind slot (groove) 27 defined on the inside surface of the outer tubular wall 18. The outer sleeve 40 thus slides relative to the outer tubular wall 18 between two positions. In FIG. 6a the insert 40 is at one extremity of its travel and the slot 21 is at its maximum size. In FIG. 6b the insert 40 is shown at the other extremity of its travel and the slot 21 is shown at its minimum size i.e. it is reduced to a negligible opening.

Figure 7A:
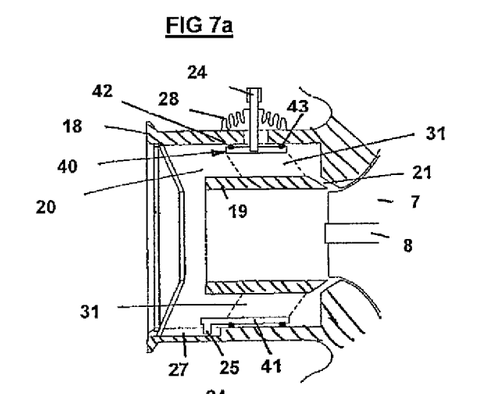
FIGS. 7a and 7b are axial sectioned views of an inlet part of a fifth embodiment of a compressor in accordance with the present invention, shown in first and second configurations.
Figure 7B:
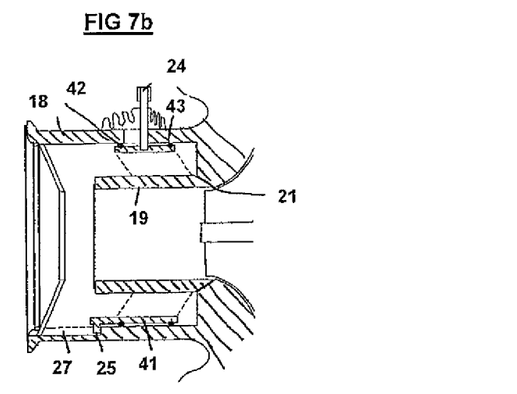

The embodiment of FIGS. 7a and 7b again uses a sliding insert 40 but the outer sleeve 41 and the helical groove 27 are shorter compared to their counterparts in FIGS. 6a and 6b. Moreover, the pegs 24 and 25 are axially offset so at to accommodate two axially spaced sealing rings 43, 44 between the outside surface of the outer sleeve 41 and the inside surface of the outer tubular wall 18. The sealing rings 43, 44 serve to prevent the ingress of debris, particularly from unfiltered air, that increases the risk of jamming the mechanism. In the figures the compressor is shown with both the sealing rings 43, 44 and the protective guard 28, although it will be appreciated that embodiments with one or the other may be adopted.

In the embodiments of FIGS. 6 and 7 the outer sleeve 41 need not be a complete cylinder but may comprise a plurality of discrete components each supported by a respective strut 31. The components slide together in the helical direction to effect opening and closing of the slot 21.

Figure 8A:
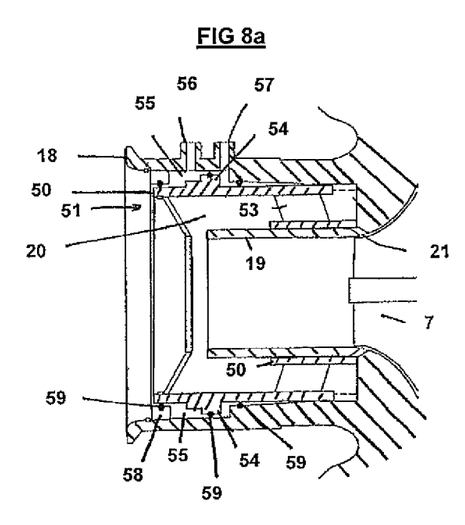
FIGS. 8a and 8b are axial sectioned views of an inlet part of a sixth embodiment of a compressor in accordance with the present invention, shown in first and second configurations.
Figure 8B:
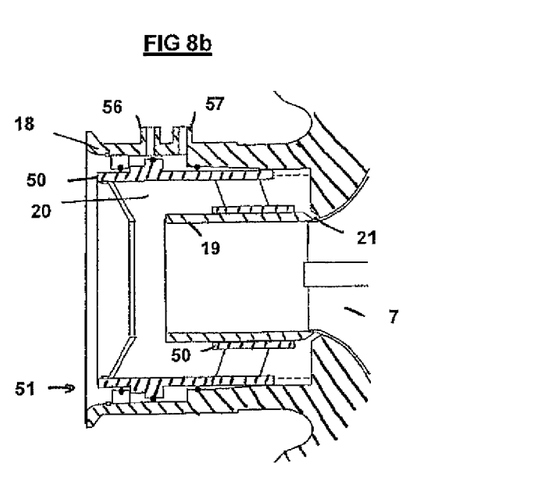

The compressor inlet arrangement depicted in the embodiment of FIGS. 8a and 8b uses a sliding inner sleeve 50 to block and unblock the annular slot 21 at the end of the annular flow passage 20 as part of an insert 51 that also comprises an outer sliding sleeve 52 that is concentric with the inner sleeve 50. The inner and outer sleeves 50, 52 are interconnected by a plurality of radial struts (two shown) 53 and the noise baffle 22 is connected as a separate component to the outer sleeve 52 (although it will be appreciated that it could be integrally formed). The insert 51 is designed to be pneumatically operated to move between the respective positions shown in FIGS. 8a and 8b in a substantially helical motion. In this particular embodiment there is a first annular rib 54 that extends radially outwards of the outer sleeve 52 into a corresponding groove 55 defined in the inner surface of the outer tubular wall 18. The outer wall 18 is penetrated by a pair of ports 56, 57 for connection to a source of pressurised air disposed one each side of the first annular rib 54. A second annular rib 58 is defined on the inside surface of the outer tubular wall 18 so as to close the groove 55 in the axial direction. In operation pressurised air is injected into one or other of the ports 56, 57 to move the insert 51 in the required direction. Any suitable interfacing formations are provided between the insert 51 and the outer surface of the outer sleeve 52 to guide the insert in the part-helical movement. Sealing rings 59 are provided between the insert 51 and the outer tubular wall 18 at the first and second annular ribs 54, 58 and between the outer sleeve 52 and the outer tubular wall 18 at a location between the first annular rib 54 and the slot 21. Air is injected into port 56 to move the insert 51 to the left to the position shown in FIG. 8a wherein the inner sleeve 50 overlies the slot 21 so as to prevent communication between the annular flow passage 20 and the impeller 7. Similarly air is injected into port 57 to move the insert 51 in the opposite direction to the position shown in FIG. 8b wherein the inner sleeve 50 moves clear of the slot 21 so as to allow air to flow between the impeller and the annular flow passage 20.

It will be appreciated that in a variation to the embodiment shown in FIGS. 8a and 8b only one of the ports 56, 57 may be provided for the injection of pressurised air and the insert 51 may be biased into one of the positions shown in the figures. Any suitable biasing member may be provided such as, for example, a spring. Injection of the air into the port would serve to move the insert 51 against the biasing force applied by the biasing member.

FIG. 9 shows an embodiment similar to that of FIGS. 6 and 7 in which the inner tubular wall 19 is slidable in the part-helical direction relative to the outer tubular wall 18. Three pegs 24, 25 are provided and each extends to the inner tubular wall 19 to which it is fixed. One of the pegs 24 extends radially outwards through an open slot 26 in the outer tubular wall 18 and is connected at its free end to an actuator 61 mounted on the outer surface of the compressor housing 6. The other two pegs 25 are also fixed to the inner tubular wall 18 and are received in blind slots (e.g. grooves) 27 formed in the outer tubular wall 18. The actuator 61 is a solenoid with a plunger 62 connected by any suitable means to the peg 24 and is mounted on an external part of the housing that defines the volute 12. The plunger 62 is retractable into the housing of the solenoid when energised and is biased to an extended position by a spring 63 supported around the plunger 62. In the example depicted the plunger 62 is curved and may be flexible or resiliently flexible. It will be appreciated that other biasing members may be used in place of the spring. The flexibility of the plunger 62 is such that it can move the peg 24 so as to effect helical movement of the inner tubular wall 19 but any angular misalignment between the plunger 62 and the peg 24 or the part-helical slot 26 is tolerated. A joint between the plunger 62 and the peg 24 may be designed to accommodate any such misalignment in which case a rigid plunger may be used. The actuator 61 may be concealed by a suitable cover 64 as shown.

Any suitable actuator may be adopted for moving the inner and/or outer sleeve of any of the embodiments disclosed herein in order to open or close the slot 21. For example, besides a solenoid actuator it may be a pneumatic or hydraulic actuator which may have a plunger for connection to the structure. Alternatively a motor driven actuator may be provided.

The actuator may be connected to a linkage mechanism such as a yoke which may be connected to the inner or outer sleeve at several locations such that the force imparting movement to the sleeve is distributed about the sleeve.

Figure 10:
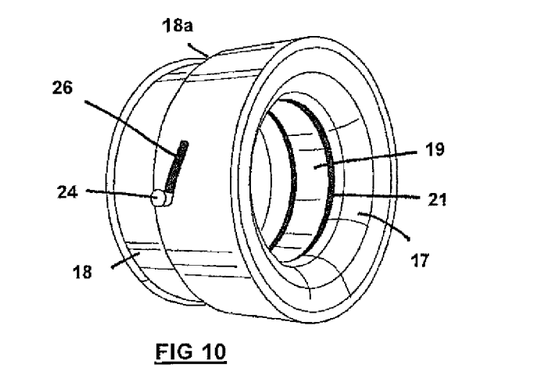
FIG. 10 is a perspective view of an inlet of a compressor in accordance with the present invention and looking from the impeller wheel end.

FIG. 10 illustrates the part-helical form of the slot 26 in the outer tubular wall 18 of the compressor inlet. In this particular embodiment the inlet of the compressor housing is shown without the rest of the compressor housing and the outer tubular wall 18 has an annular shoulder 18a. The view is shown from the impeller side of the compressor and the curved wall 17 at the forefront of the picture is that over which the impeller blades 15 sweep. From this viewpoint the annular slot 21 at the end of the annular flow passage 20 can be seen as can the inside surface of the inner tubular wall 19.

Figure 11:
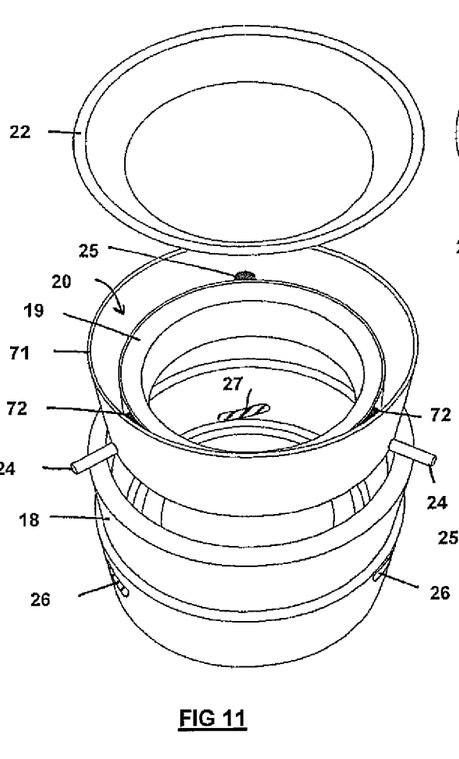
FIG. 11 is an exploded perspective view of a further embodiment of the compressor inlet in accordance with the present invention.
Figure 12:
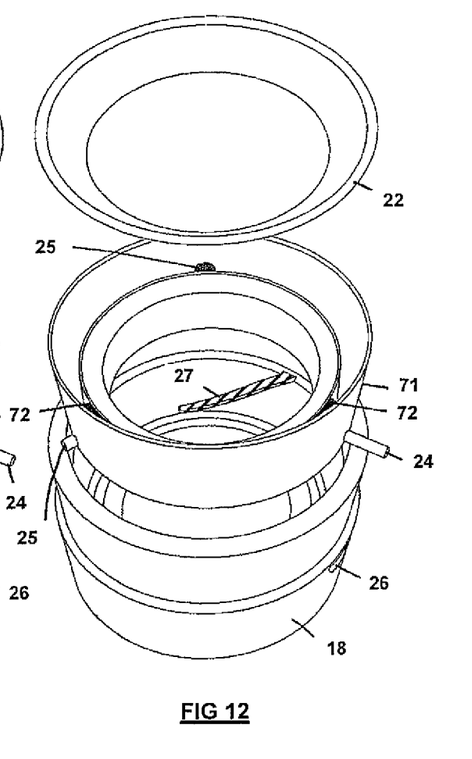
FIG. 12 is an exploded perspective view of a yet further embodiment of the compressor inlet in accordance with the present invention.

FIGS. 11 and 12 serve to illustrate the helical grooves 27 formed in the inside surface of the outer tubular wall 18. In these embodiments the compressor inlet is again shown separated from the rest of the compressor housing and the annular flow passage 20 is provided by an insert 70 that defines the inner tubular wall 19 and an outer sleeve 71 in a similar arrangement to that described in relation to FIGS. 6a and 6b. As in that embodiment the inner tubular wall 19 moves with the insert 70 to open and close the slot 21 at the end of the annular flow passage 20. The outer sleeve 71 is fixed relative to the inner tubular wall 19 by means of generally radial struts 72, two of which are just visible in each case. In the embodiment of FIG. 11 there are two relatively long pegs 24 that extend through open slots 26 in the outer tubular wall 18 and a third relatively short peg 25 that is received in a groove 27 defined on the inside surface of the outer tubular wall 18. In the embodiment of FIG. 12 there is only one relative long peg 24 and corresponding slot 26 and two relative short pegs 25 for receipt in part-helical grooves 27 (only one visible) in the outer wall 18. In each of the embodiments a noise-reduction baffle 22 is a separate component for press-fit engagement in the outer wall.

It will be appreciated that in any of the preceding embodiments any suitable number of pegs 24, 25 may be provided with any suitable combination of open slots 26 and grooves 27 in the outer tubular wall 18.

In any of the preceding embodiments the helical guide arrangement may allow a limited degree of play. For instance there may be a clearance between the pegs and respective slots. The sliding contact surfaces and seal surfaces are preferably machined with precision to ensure a smooth finish that mitigates against jamming. They may be treated by, for example, roller burnishing and coated with a suitable low friction layer.

Any of the above compressor designs are suitable for use in a turbocharger, an example of which is shown in claims 1. In all instances the compressor inlet structure is selectively operable to modify the size of the slot 21 as required. The structure may be configured to be operable between only two positions i.e. the slot open and the slot closed, or alternatively it may be configured to modulate the degree of opening having multiple potential positions.

During operation of the turbocharger, the turbine 1 is driven in rotation by the exhaust gases from the engine in the usual manner and the consequent rotation of the compressor impeller 7 causes air to be drawn into the inlet 13. The air pressure in the chamber at the impeller wheel 7 is normally lower than atmospheric pressure and during high gas flow rates, the pressure of the air in the area swept by the impeller air is even less. When the slot 21 is open air is drawn from the annular flow passage 20 via the annular slot 21 to increase the volume of air flow reaching the impeller 7. As the air flow decreases the flow from the annular flow passage 20 decreases until equilibrium is reached. A further drop in the impeller wheel flow results in the pressure in the area swept by the impeller wheel 1 increasing above that in the annular flow passage 20 and thus there is a reversal in the direction of flow of air through the annular slot 21. That is, under such conditions the air flows outwards from the impeller wheel 7 into the annular flow passage 20 and re-circulated to the intake, thus delaying surge. The reversal in air flow prevents turbulence disrupting the air flow at the leading edge of the impeller so that stall and subsequent surge is avoided. During other flow conditions the slot may be closed so as to improve the efficiency of operation of the compressor. The arrangement of the present invention provides for selective use of the MWE™ inlet structure depending on in which part of the compressor map the compressor is being operated.

It will be appreciated that numerous modifications to the above described designs may be made without departing from the scope of the invention as defined in the appended claims. For example, any inter-engagement between the inner or outer sleeve and the compressor housing may be adopted provided it supports movement of the sleeve in a helical direction. In particular the pegs may be replaced by any form of protrusion for engagement in any form of open or blind slot in the outer tubular wall. Alternatively one or more threaded connections may be provided between the sleeve and the outer or inner tubular wall. The movement of the sleeve preferably describes a relatively tight helix so as to reduce the risk of axial misalignment e.g. it is arranged at an angle of more than 45 degrees to the axis and preferably between 60 and 80 degrees. However, in other embodiments, particularly where the actuator is provided with a linkage mechanism connected to several positions around the sleeve, it may describe a relatively shallow helix of less than 45 degrees and preferably between 10 and 30 degrees.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A compressor comprising:
a housing having a gas inlet and a gas outlet;
an impeller wheel having a plurality of vanes and mounted in the housing between said inlet and outlet, the wheel being rotatable about an axis;
the housing having an inner wall defining a surface located in close proximity to radially outer edges of the impeller vanes which sweep across said surface as the impeller wheel rotates about its axis;
the gas inlet comprising an outer tubular wall extending away from the impeller wheel in an upstream direction and defining a gas intake portion of the inlet, and an inner tubular wall extending away from the impeller wheel in an upstream direction within the outer tubular wall and defining an inducer portion of the inlet;
a gas flow passage defined between the inner and outer tubular walls;
at least one bleed passage providing fluid communication between the impeller wheel and the gas flow passage;
a sliding member disposed in the inlet and slidable between a first position in which the bleed passage has a minimum size and a second position in which the bleed passage has a maximum size;
wherein the sliding member is arranged to move between the first and second positions in a direction that describes substantially at least part of a helix.

2. A compressor according to claim 1, wherein there is provided a guide arrangement for guiding movement of the sliding member between the first and second positions in the direction.

3. A compressor according to claim 2, wherein the guide arrangement comprises at least one projection received in a corresponding at least one slot that extends a direction that describes substantially at least part of a helix.

4. A compressor according to claim 3, where the at least one projection is provided on the sliding member and the at least one slot is provided in the outer tubular wall.

5. A compressor according to claim 4, wherein the at least one slot comprises at least one first slot that defines an opening through the outer tubular wall.

6. A compressor according to claim 5, wherein the at least one projection comprises at least one first projection that projects through the at least one first slot and is moveable along the at least one first slot by an actuator so as to effect movement of the sleeve in the helical direction.

7. A compressor according to claim 4, wherein the at least one slot comprises at least one second slot in the form of a groove defined in the outer tubular wall.

8. A compressor according to claim 7, wherein the at least one projection comprises at least one second projection that extends into the groove.

9. A compressor according to claim 1, wherein the sliding member is a sleeve.

10. A compressor according to claim 9, wherein the sleeve is mounted on the inner tubular wall and slides over the inner tubular wall between the first and second positions in the direction that describes substantially at least part of a helix.

11. A compressor according to claim 9, wherein the sleeve is arranged to slide over an inside surface defined by the outer tubular wall.

12. A compressor according to claim 11, wherein the sleeve is fixed to the inner tubular wall such that in the first position of the sleeve the inner tubular wall occupies a first axial position in which the bleed passage has a minimum size and in the second position of the sleeve the inner tubular wall occupies a second axial position in which the bleed passage has a maximum size.

13. A compressor according to claim 12, wherein the bleed passage is defined between the inner tubular wall of the housing inlet and the inner wall of the housing.

14. A compressor according to claim 12, wherein there is provided a plurality of struts interconnecting the sleeve and the inner tubular wall.

15. A compressor according to claim 11, wherein the sleeve and the inner tubular wall are interconnected and are provided as a removable component for insertion into the outer tubular wall of the inlet.

16. A compressor according to 10, wherein the sleeve is an inner sleeve that is connected to an outer sleeve, the inner and outer sleeve being provided as a removable component for insertion into the outer tubular wall of the inlet, the inner sleeve being mounted on the inner tubular wall.

17. A turbocharger comprising a compressor according to claim 1, and a turbine for driving the impeller wheel in rotation and a control device for selectively controlling the movement of the sliding member between the first and second positions.

18. A compressor according to claim 1 wherein the sliding member is arranged such that as it moves between its first and second positions it continuously describes substantially at least part of a helix.

19. A method for operating a compressor, the compressor comprising a gas inlet and a gas outlet, an impeller wheel between said inlet and outlet, the wheel being rotatable about an axis, the inlet comprising inner and outer tubular walls between which a flow passage is defined, and at least one bleed passage providing fluid communication between the impeller wheel and the gas flow passage; the method comprising selectively moving a sliding member in the inlet in a substantially helical direction between a first position in which the bleed passage has a minimum size and a second position in which the bleed passage has a maximum size.

20. A compressor comprising:
a housing having a gas inlet and a gas outlet;
an impeller wheel having a plurality of vanes and mounted in the housing between said inlet and outlet, the wheel being rotatable about an axis;
the housing having an inner wall defining a surface located in close proximity to radially outer edges of the impeller vanes which sweep across said surface as the impeller wheel rotates about its axis;
the gas inlet comprising an outer tubular wall extending away from the impeller wheel in an upstream direction and defining a gas intake portion of the inlet, and an inner tubular wall extending away from the impeller wheel in an upstream direction within the outer tubular wall and defining an inducer portion of the inlet;
a gas flow passage defined between the inner and outer tubular walls;
at least one bleed passage providing fluid communication between the impeller wheel and the gas flow passage;
the inner tubular wall being slidable between a first position in which the bleed passage has a minimum size and a second position in which the bleed passage has a maximum size;
wherein the inner tubular wall is arranged to move between the first and second positions in a direction that describes substantially at least part of a helix.

21. A compressor comprising:
a housing having a gas inlet and a gas outlet;
an impeller wheel having a plurality of vanes and mounted in the housing between said inlet and outlet, the wheel being rotatable about an axis;
the housing having an inner wall defining a surface located in close proximity to radially outer edges of the impeller vanes which sweep across said surface as the impeller wheel rotates about its axis;
the gas inlet comprising an outer tubular wall extending away from the impeller wheel in an upstream direction and defining a gas intake portion of the inlet, and an inner tubular wall extending away from the impeller wheel in an upstream direction within the outer tubular wall and defining an inducer portion of the inlet;
a gas flow passage defined between the inner and outer tubular walls;
at least one bleed passage providing fluid communication between the impeller wheel and the gas flow passage;
a sliding member disposed in the inlet and slidable between a first position in which the bleed passage has a minimum size and a second position in which the bleed passage has a maximum size;
wherein the sliding member is arranged to move between the first and second positions in a direction that describes substantially at least part of a helix; and
wherein the sliding member is a sleeve arranged to slide over an inside surface defined by the outer tubular wall; and
wherein the sleeve and the inner tubular wall are interconnected and are provided as a removable component for insertion into the outer tubular wall of the inlet.

22. A compressor comprising:
a housing having a gas inlet and a gas outlet;
an impeller wheel having a plurality of vanes and mounted in the housing between said inlet and outlet, the wheel being rotatable about an axis;
the housing having an inner wall defining a surface located in close proximity to radially outer edges of the impeller vanes which sweep across said surface as the impeller wheel rotates about its axis;
the gas inlet comprising an outer tubular wall extending away from the impeller wheel in an upstream direction and defining a gas intake portion of the inlet, and an inner tubular wall extending away from the impeller wheel in an upstream direction within the outer tubular wall and defining an inducer portion of the inlet;
a gas flow passage defined between the inner and outer tubular walls;
at least one bleed passage providing fluid communication between the impeller wheel and the gas flow passage;
a sliding member disposed in the inlet and slidable between a first position in which the bleed passage has a minimum size and a second position in which the bleed passage has a maximum size;

wherein the sliding member is arranged to move between the first and second positions in a direction that describes substantially at least part of a helix;

wherein the sliding member is a sleeve; and wherein the sleeve is mounted on the inner tubular wall and slides over the inner tubular wall between the first and second positions in the direction that describes substantially at least part of a helix; and wherein the sleeve is an inner sleeve that is connected to an outer sleeve, the inner and outer sleeve being provided as a removable component for insertion into the outer tubular wall of the inlet, the inner sleeve being mounted on the inner tubular wall.

* * * * *